UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

PROCESS OF MAKING PYROXYLIN COMPOUNDS.

1,292,819.     Specification of Letters Patent.     Patented Jan. 28, 1919.

No Drawing. Original application filed May 11, 1916, Serial No. 96,791. Divided and this application filed June 15, 1917. Serial No. 174,903.

*To all whom it may concern:*

Be it known that I, WILLIAM G. LINDSAY, a citizen of the United States, residing at Newark, in the county of Essex and State of New Jersey, have invented certain new and useful Improvements in Processes of Making Pyroxylin Compounds, of which the following is a specification.

This invention relates to a process of making thermo-plastic pyroxylin compounds and has particular reference to the use of certain liquids with pyroxylin in the manufacture of such compounds. The present application is a division of my application, Serial No. 96,791, filed May 11, 1916.

Heretofore, it has been the usual practice to manufacture thermo-plastic compounds, of which "celluloid" is the principal example, by combining camphor with pyroxylin according to means which are well known to the art.

It has been proposed to combine pyroxylin with other substances, mainly for the purpose of producing a cheaper product, in some cases for the purpose of producing an odorless product, and in other instances to overcome the inflammability of the nitrocellulose; but, so far as I am aware, none of the substances, other than camphor, has met with any wide or extended application.

The various substances so proposed have been found to be more or less defective because of deficiency in solubility with respect to the alcoholic or volatile liquid solvent or with respect to the pyroxylin. Again, some are objectionable because of odor, or color, or other detrimental chemical and physical properties.

According to the present state of the art, camphor is the principal substance used in combination with pyroxylin for the manufacture of this particular class of pyroxylin compounds, and in commercial practice few, if any, oils or non-volatile liquid substances are used in single combination with pyroxylin in plastic combinations. Attempts to combine such oils or liquid substances with the pyroxylin have met with difficulty owing to the peculiar nature of such substances and their deficiency in requisite solvent action.

Heretofore, so far as I am aware, in all attempts to combine such oils or non-volatile liquid substances with the pyroxylin, it has been thought necessary to first free the pyroxylin from the water remaining after washing out the nitrating acid, before combining the pyroxylin with the oil or liquid substance. In some cases, the pyroxylin is dehydrated by the use of alcohol and the non-volatile liquid then added, and in other cases the pyroxylin is dehydrated by pressure, absorption, or evaporation, and the oil or liquid is added previously mixed with alcohol, or mixed with the dehydrated or dried pyroxylin with subsequent addition of alcoholic solvent. In other words, the non-volatile liquid solvent is always added after the pyroxylin has been dried or freed from water to permit the required solvent action.

These processes are open to objection because of the necessity of using large quantities of volatile liquid solvents in order to bring about homogeneous penetration and the requisite uniform and complete combination between the non-volatile liquid and the pyroxylin.

So far as I am aware, it has never been suggested heretofore that, in the manufacture of pyroxylin compounds, a liquid as herein specified could be successfully introduced without first dehydrating the pyroxylin. This has doubtless been due to the natural expectation that the means employed to express the water would also express the liquid.

Now I have discovered that a certain class of non-volatile liquids may be successfully combined with pyroxylin by means of a process which in the preliminary stage promotes the elimination of the water from the wet pyroxylin and in the final stage produces such an intimate combination of the pyroxylin and the non-volatile liquid that upon the addition of the alcoholic or other suitable volatile liquid solvent, in accordance with the customary further practice in the manufacture and manipulation of "celluloid," the solvent action thereof is greatly augmented and the penetration facilitated. This augmented solvent action which takes place after the elimination of the water greatly extends the successful application of these oils and liquids in the manufacture of pyroxylin plastic compounds.

The process which I have discovered consists in grinding the wet pyroxylin with the non-volatile liquid substance and treating the resultant mixture to pressure and absorption. By this means the water is expelled and the non-volatile liquid substance is retained by the pyroxylin, and on subsequent treatment with bibulous pads the remainder of the water is eliminated, or the finely-ground mixture of wet pyroxylin and liquid constituent may be freed from water by drying either at ordinary temperature under normal atmospheric condition or in a closed receptacle at a suitable temperature by means of diminished pressure.

The special class of liquids to which I refer are those which are substantially insoluble in water and are either non-volatile or substantially so. One example in this class is benzyl benzoate, the use of which is described in my United States Patent No. 961,360, dated June 14, 1910. Another example is liquid tricresylphosphate. Other examples will be found among the various essential oils of low volatility or other liquids which are known to possess either solvent power on the pyroxylin, or an affinity for it, especially such an affinity as permits the rousing of solvent power by the action of a substance containing an hydroxyl group, as by the addition of alcohol, or other menstruum used in this art. In this class of non-volatile liquids, I also include such substances as castor oil, which, as is well known, has an appreciable affinity for pyroxylin, especially under the stimulating influence of alcohol or equivalent menstrua.

I also include any liquid which might be formed by mixing two solid solvents or substances useful in combinations of pyroxylin as part of the solvent mixture. For example, I can use a mixture of triphenylphosphate and camphor, which form a liquid when mixed together, the preferred proportion for such effect being 35 parts of camphor and 65 parts of triphenylphosphate.

I also include camphor or other solid solvent in combination wth a fluid of relatively high boiling point which is substantially insoluble in water; for example, a combination of camphor and fusel oil, though I prefer the use of a liquid which is practically, in all of its elements, substantially non-volatile, i. e., a liquid which remains to a large degree a part of the finished combination and resembles camphor in that it imparts plasticity under heat to the final or substantially dry material.

I also include within the term "liquid" such oleaginous substances as have the above-stated characteristics pertaining to benzyl benzoate, castor oil, etc.

In carrying out my process, I thoroughly mix, preferably by grinding action, the hydrous pyroxylin with one or more members of the special class of solvents mentioned. After this thorough mixing, I preferably form the pulp into cakes and remove the water by pressure between bibulous pads, sometimes taking out the excess by a preliminary squeeze or equivalent means. Contrary to what might be supposed, it will be found that the water is extracted by itself and the liquids remain in combination with the pyroxylin. They are not absorbed away or pressed out with the water. In fact, there are indications that the solvent has actually assisted in dispelling the water by a sort of displacement action.

The resultant dried cake has the appearance of a camphor pyroxylin combination and, when subjected to the usual subsequent operations, such as the addition of alcohol or other liquid solvents, presents the same features; i. e., the amount of such alcohol or other active liquid can be varied at will and the cake combination will present a union, or good mixture, of the non-volatile liquid solvent with the pyroxylin, as in the case of camphor.

While I prefer the pad and pressure method of removing the water, this may be accomplished by simply exposing the wet cake to the air, or by spreading out the wet pulp and allowing the water to evaporate. In such cases the pyroxylin is retained in sufficiently thorough combination with the non-volatile liquid solvent, and to a large extent the same advantages of control and good mixture which follow the use of pressure and pads are secured. The further treatment of the compound is in accordance with the usual steps for the production of "celluloid" in suitable form. The material may be mixed with pigments in the usual way and either rolled or kneaded according to well-known methods, or by using a greater quantity of volatile solvent flowed as film, or in fact treated in any suitable manner according to the nature of the ultimate product desired. In my use of the term "thermo-plastic" herein, I mean moldable, and hence include thin sheets or other products not specially designed for molding, but nevertheless possessing plastic properties.

The action of the solvents is within the control of the operator, who will be guided in his selection and proportions by the desired character of the product and the peculiar activity of the menstrua. Although the object of my invention is primarily to facilitate the combination of the pyroxylin with such liquid solvents as are required or desired to remain largely in the finished product, I believe it to be the fact that the solvent power of the menstrua is given a better opportunity for attaining its specific effect by reason of the process and that the operator will have less difficulty in securing the desired conversion or solution than when employing the older methods.

Having thus described my invention, what I claim and desire to secure by Letters Patent is:—

1. The process of making a pyroxylin compound which consists in mixing hydrous pyroxylin with benzyl benzoate and then removing the water therefrom.

2. The process of making a pyroxylin compound which consists in mixing hydrous pyroxylin with benzyl benzoate and then expressing the water therefrom.

WILLIAM G. LINDSAY.